(12) United States Patent
Dohi

(10) Patent No.: US 11,065,732 B2
(45) Date of Patent: Jul. 20, 2021

(54) SETUP CHANGING METHOD AND MACHINING SYSTEM

(71) Applicant: Fanuc Corporation, Yamanashi (JP)

(72) Inventor: Yoshiaki Dohi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 98 days.

(21) Appl. No.: 16/660,984

(22) Filed: Oct. 23, 2019

(65) Prior Publication Data

US 2020/0156196 A1 May 21, 2020

(30) Foreign Application Priority Data

Nov. 15, 2018 (JP) .............................. JP2018-214755

(51) Int. Cl.
| | | |
|---|---|---|
| *B23Q 3/157* | (2006.01) | |
| *B23Q 3/06* | (2006.01) | |
| *B23Q 7/04* | (2006.01) | |
| *B23Q 3/155* | (2006.01) | |

(52) U.S. Cl.
CPC .......... *B23Q 3/1576* (2013.01); *B23Q 3/062* (2013.01); *B23Q 3/15526* (2013.01); *B23Q 3/15536* (2016.11); *B23Q 3/15722* (2016.11); *B23Q 7/045* (2013.01); *B23Q 7/046* (2013.01); *B23Q 2003/15586* (2013.01); *B23Q 2230/002* (2013.01); *Y10T 29/53961* (2015.01); *Y10T 483/10* (2015.01); *Y10T 483/16* (2015.01)

(58) Field of Classification Search
CPC ............. Y10T 29/53961; Y10T 483/16; Y10T 483/165; B23Q 3/15534; B23Q 7/045; B23Q 7/046; B23Q 2230/002; B25B 11/00

USPC ................ 269/45, 55, 166, 266; 483/14, 15; 29/281.1

See application file for complete search history.

(56) References Cited

U.S. PATENT DOCUMENTS

| | | | | |
|---|---|---|---|---|
| 4,572,564 A | * | 2/1986 | Cipolla | ................. B25B 1/2421 269/266 |
| 5,803,886 A | * | 9/1998 | Schweizer | ............. B23Q 7/045 483/31 |
| 5,919,011 A | * | 7/1999 | Schweizer | ............. B23Q 7/045 409/131 |
| 7,103,955 B2 | * | 9/2006 | Murai | .................... B23Q 7/045 29/418 |

(Continued)

FOREIGN PATENT DOCUMENTS

| | | |
|---|---|---|
| JP | 57083331 A | 5/1982 |
| JP | 06055399 A | 3/1994 |

(Continued)

*Primary Examiner* — Erica E Cadugan
*Assistant Examiner* — Michael Vitale
(74) *Attorney, Agent, or Firm* — RatnerPrestia

(57) ABSTRACT

A machine tool setup changing method includes mounting a master workpiece onto a tool spindle axis, deforming a gripping part by gripping, with the gripping part of a jig, a mock clamped portion of the master workpiece mounted on the tool spindle axis, and removing the master workpiece from the tool spindle axis and mounting a tool supported on a tool support device onto the tool spindle axis, wherein the workpiece gripped at the clamped portion by the gripping part, which was deformed in accordance with the mock clamped portion, can be machined with the tool.

9 Claims, 15 Drawing Sheets

(56) References Cited

U.S. PATENT DOCUMENTS

| | | | | |
|---|---|---|---|---|
| 8,092,357 | B1* | 1/2012 | Buus | B23Q 7/045 |
| | | | | 483/41 |
| 9,272,422 | B2* | 3/2016 | Matsuoka | B25J 15/0028 |
| 2005/0029727 | A1* | 2/2005 | Siegel | B25B 1/08 |
| | | | | 269/266 |
| 2011/0291342 | A1* | 12/2011 | Gindy | B25B 1/2421 |
| | | | | 269/266 |
| 2016/0114444 | A1* | 4/2016 | Hofmann | B65G 47/90 |
| | | | | 414/222.07 |

FOREIGN PATENT DOCUMENTS

| JP | 2002046036 A | 2/2002 |
|---|---|---|
| JP | 2012125862 A | 7/2012 |
| JP | 2014-008583 A | 1/2014 |

\* cited by examiner

SETUP CHANGING METHOD AND MACHINING SYSTEM

CROSS-REFERENCE TO RELATED APPLICATIONS

This application is a new U.S. Patent Application that claims benefit of Japanese Patent Application No. 2018-214755, dated Nov. 15, 2018, the disclosure of this application is being incorporated herein by reference in its entirety for all purposes.

BACKGROUND OF THE INVENTION

1. Field of the Invention

The present invention relates to a machine tool setup changing method and a machining system.

2. Description of Related Art

In machine tools such as machining centers, in order to efficiently machine workpieces having different shapes, jigs including gripping parts which deform in accordance with the shape of the workpiece are used, in some cases, as machining jigs for clamping the workpiece. Japanese Unexamined Patent Publication (Kokai) No. 2014-8583A describes, as an example of such a jig, a gripping device including contact parts which are capable of deforming in accordance with the shape of a workpiece by hardening and softening.

SUMMARY OF THE INVENTION

When the type of the workpiece to be machined in the machine tool changes, it is necessary to change the setup, including an operation for making the shape of the machining jig conform to the shape of the new workpiece to be machined, as described above. In setup changing operations, it is necessary to accurately position the workpiece with respect to the machining jig and form the machining jig so that the shape thereof conforms with the shape of the workpiece. Conventionally, such an operation is performed by an operator, which takes time and effort. Thus, a method and a machining system which is capable of accurately positioning a workpiece with respect to a machining jig during setup changing and which is capable of efficiently performing setup changing has been demanded.

An aspect of the present disclosure provides a setup changing method for a machine tool comprising a tool spindle axis, a tool support device which supports a tool which is exchangeably attachable to the tool spindle axis, and a jig having a gripping part which deforms in accordance with a shape of a clamped portion of a workpiece, the method comprising: mounting, onto the tool spindle axis, a master workpiece having a mock clamped portion which has the same shape as the shape of the clamped portion of the workpiece; deforming the gripping part by gripping, with the gripping part of the jig, the mock clamped portion of the master workpiece mounted on the tool spindle axis; and removing the master workpiece mounted on the tool spindle axis and mounting the tool supported on the tool support device onto the tool spindle axis, wherein the workpiece, the clamped portion of which is gripped by the gripping part deformed in accordance with the mock clamped portion, can be machined with the tool.

Another aspect of the present disclosure provides a machining system, comprising: a machine tool comprising a tool spindle axis, a tool support device which supports a tool which is exchangeably attachable to the tool spindle axis, and a jig having a gripping part which deforms in accordance with a shape of a clamped portion of a workpiece; and a controller that controls the machine tool, wherein the controller causes: a master workpiece, which includes a mock clamped portion having the same shape as the shape of the clamped portion of the workpiece and which is held on the tool support device, to be mounted onto the tool spindle axis; the gripping part to be deformed by gripping the mock clamped portion of the master workpiece, which is mounted on the tool spindle axis, with the gripping part of the jig; and the master workpiece mounted on the tool spindle axis to be removed, and the tool supported on the tool support device to be mounted onto the tool spindle axis, and wherein the workpiece, the clamped portion of which is gripped by the gripping part deformed in accordance with the mock clamped portion, can be machined with the tool.

BRIEF DESCRIPTION OF THE DRAWINGS

The object, features, and advantages of the present invention will be elucidated from the description of the embodiments below with reference to the attached drawings. In the drawings.

DETAILED DESCRIPTION

Figure 1:
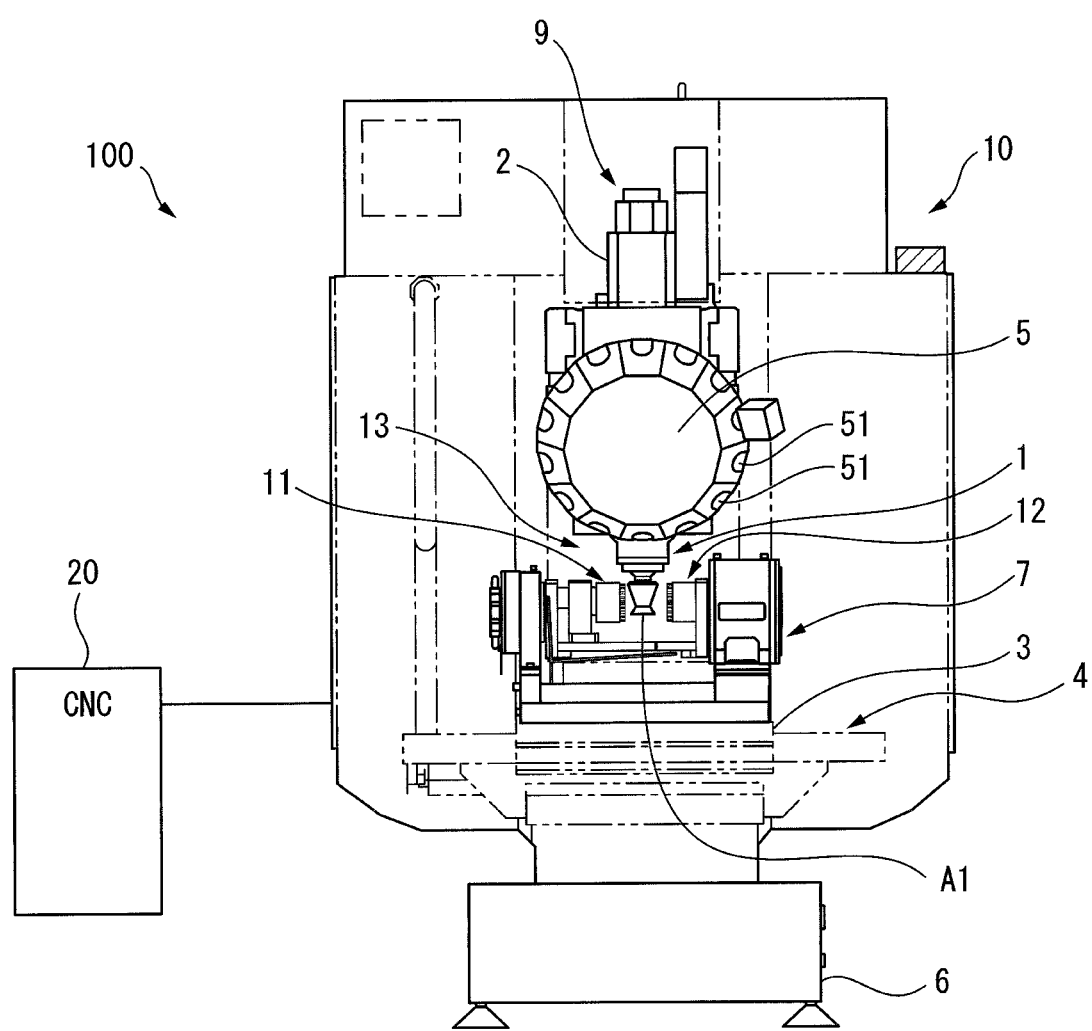
FIG. 1 is a view showing the overall configuration of a machining system according to an embodiment.

The embodiments of the present disclosure will be described below with reference to the attached drawings. In the drawings, corresponding constituent elements are assigned common reference signs. In order to facilitate understanding, the drawings have been appropriately modified in scale. Furthermore, the aspects shown in the drawings are merely examples for carrying out the present invention. The present invention is not limited to the illustrated aspects.

FIG. 1 is a view showing the overall configuration of a machining system 100 according to an embodiment. The machining system 100 comprises a machine tool 10, which is configured as a so-called vertical machining center, and a CNC (computerized numerical controller) 20 which controls the machine tool 10. The CNC 20 may be incorporated in the machine tool 10. The machine tool 10 comprises a tool spindle axis 1, a spindle axis head 2 which supports the tool spindle axis 1 so as to be rotatable about the vertical axis, a spindle axis movement mechanism 9 which moves the spindle axis head 2, a movable table 3 arranged below the tool spindle axis 1, a workpiece retention mechanism 7 arranged on the movable table 3, a movement mechanism 4 for driving the movable table 3 in the horizontal directions, and a base 6 on which the movement mechanism 4 is mounted. The CNC 20 may be configured as a conventional computer having a CPU, a ROM, a RAM, a storage device, a display unit, an operation unit, a communication function, etc.

A turret 5 constituting a retention device for retaining a plurality of tools to be exchangeable with respect to the tool spindle axis 1 is arranged on the side of the spindle axis head 2. The turret 5 includes a plurality of tool holders 51 arranged in the circumferential direction, and is arranged so as to be capable of indexing about a pivot axis (not illustrated). The turret 5 is arranged so as to be swingable by means of an unillustrated mechanism between a retracted position inclined relative to the vertical direction and a tool exchange position adjacent to the area directly below the tool spindle axis 1. In this configuration, under control of the CNC 20, and in a state in which the turret 5 is positioned in the tool exchange position, the turret 5 undergoes indexing rotation so that a desired tool can be mounted on the tool spindle axis 1. The movable table 3 is movable in the horizontal directions relative to the base 6 by the movement mechanism 4. The workpiece retention mechanism 7 fixed to the movable table 3 comprises a machining jig 13 which clamps the workpiece. The machining jig 13 comprises shape-receiving jigs 11, 12 which can deform in accordance with the shape of the workpiece. Note that a master workpiece including a mock clamped portion having the same shape as the clamped portion of a workpiece to be machined can be attached to the turret 5. The machine tool 10 clamps the workpiece with the shape-receiving jigs 11, 12 disposed on the workpiece retention mechanism 7, and performs machining for the workpiece with the tool attached to the tool spindle axis 1.

Figure 14:
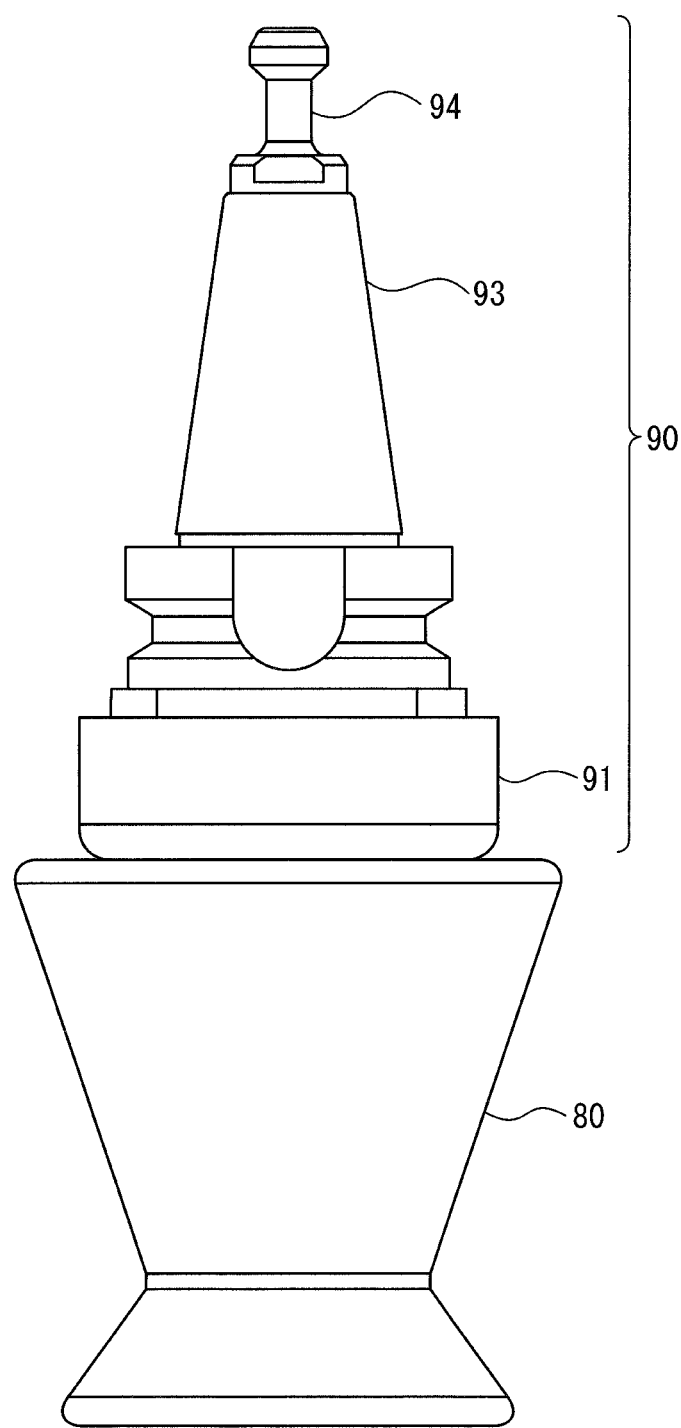
FIG. 14 is a view showing the structure of the master workpiece.
Figure 15:
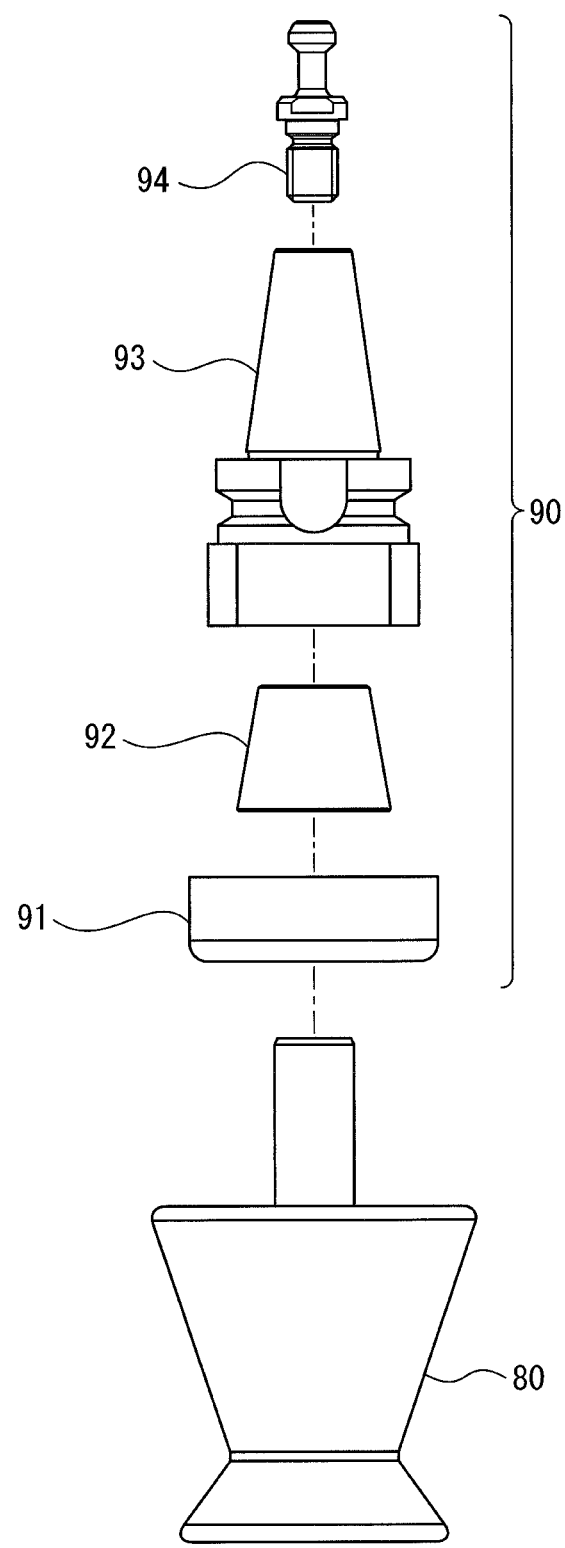
FIG. 15 is an exploded view of the master workpiece.

Regarding the master workpiece, a body 80 of the master workpiece can be, for example, retained on the tool holder 51 of the turret 5 via a so-called collet-type holder part 90, as shown in FIG. 14 (a structural view of the master workpiece) and FIG. 15 (an exploded view of the master workpiece), and can be mounted on the tool spindle axis 1. The holder part 90 may be constituted from a cap 91, a collet 92 which grips the body 80 of the master workpiece, a holder 93, and a pull bolt 94.

Figure 2:
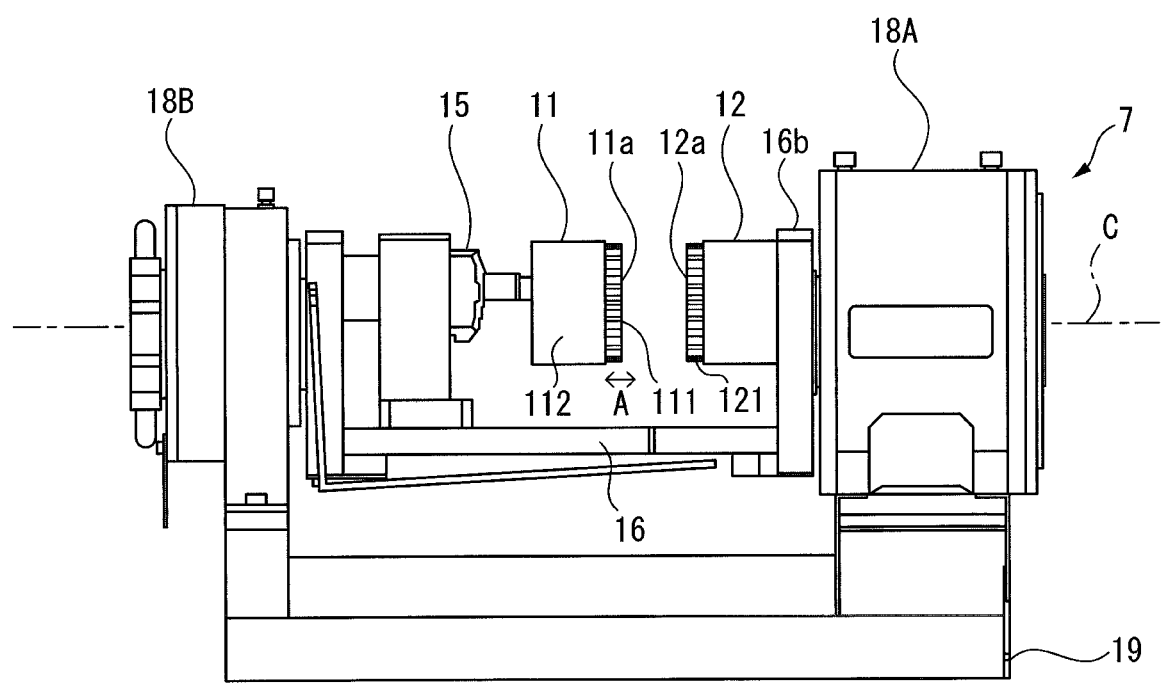
FIG. 2 is a front view of a workpiece retention mechanism.
Figure 3:
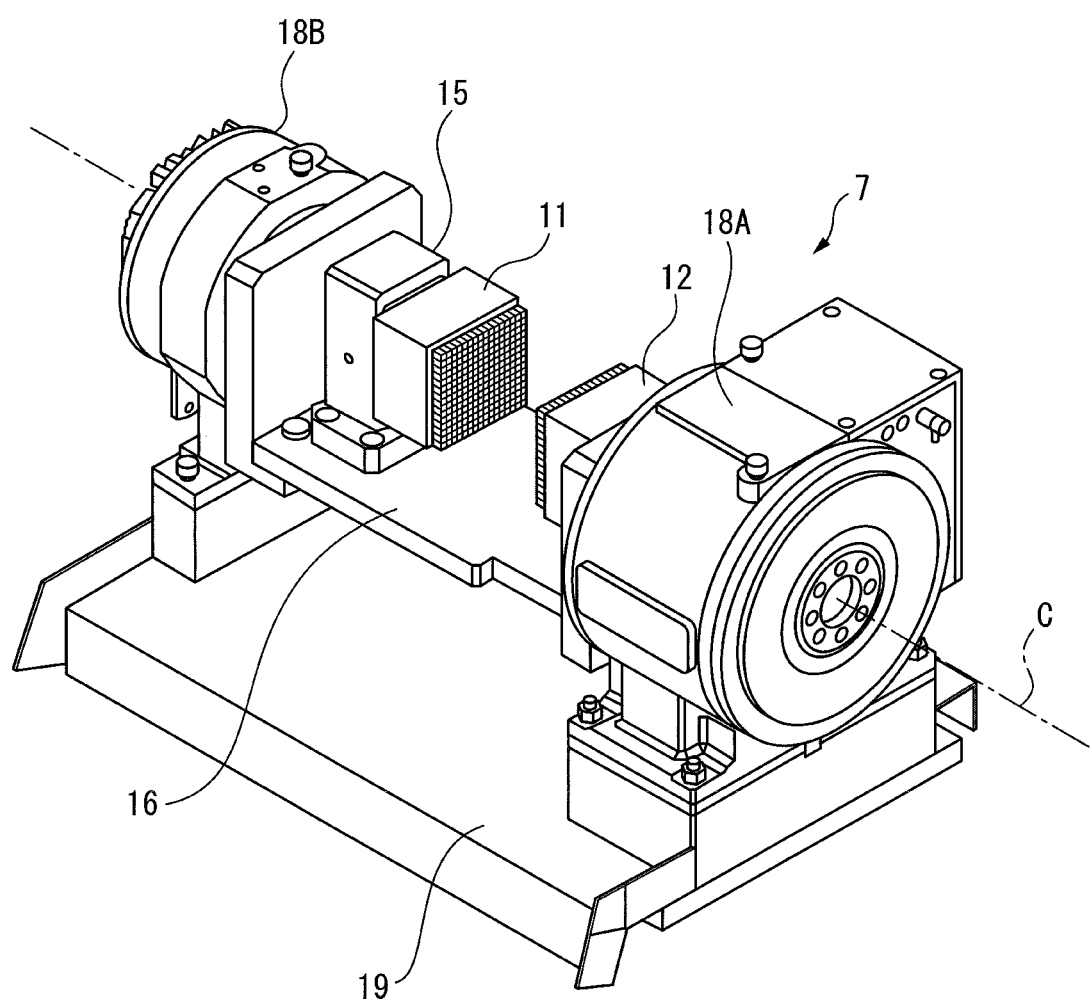
FIG. 3 is a perspective view of the workpiece retention mechanism.

FIGS. 2 and 3 are a front view and a perspective view of the workpiece retention mechanism 7, respectively. As shown in FIGS. 2 and 3, the workpiece retention mechanism 7 comprises a base 19 which is fixed to the movable table 3, rotary drive units 18A, 18B which are fixed to the base 19, a swingable table 16 which is fixed to the rotary shafts of the rotary drive units 18A, 18B, a linear cylinder 15 which is attached to the swingable table 16, and the shape-receiving jigs 11, 12. The linear cylinder 15 and the shape-receiving jigs 11, 12 constitute the machining jig 13. The shape-receiving jig 11 is attached to the tip of the movable shaft of the linear cylinder 15, and can move in the axial direction of the movable shaft of the linear cylinder 15. The shape receiving jig 12 is fixed to a side wall 16b of the swingable table 16 on the side opposite the shape-receiving jig 11. The shape-receiving jigs 11, 12 are configured such that by pressing the master workpiece against the pin tips 11a, 12a, the pin tips 11a, 12a deform in accordance with the shape of the master workpiece, and the received shapes thereof can be locked. The rotary drive units 18A, 18B can rotate the swingable table 16 about the axis of rotation C.

The shape-receiving jigs 11, 12, which constitute the gripping parts of the machining jig 13, will be described. Note that since the shape receiving jigs 11, 12 have identical structures, the shape-receiving jig 11 will be described. The shape receiving jig 11 comprises a plurality of straight pins 111, and an accommodation unit 112 which accommodates the base end sides of the plurality of pins 111. Each pin 111 is freely movable in the central axial direction thereof (the directions of arrow A), and in the reset state shown in FIGS. 2 and 3, the positions of the pin tips 11a in the direction of arrow A are aligned, whereby an overall flat shape-receiving portion is formed as shown in FIGS. 2 and 3. When the master workpiece is pressed against the pin tips 11a, the pins 111 which are pressed by the master workpiece are displaced toward the accommodation unit 112 side, and as a result, the pin tips 11a form a shape which follows the shape of the master workpiece. By locking the positions of all of the pins 111 in such a state in the accommodation unit 112, the pin tips 11a can retain a shape which follows the outer shape of the master workpiece.

Note that jigs of various structures which are known in the art can be used as the shape-receiving jigs which can retain the shape of the workpiece by displacing a plurality of pins in the axial direction thereof in accordance with the outer shape of a workpiece. For example, various configurations which are known in the art, such as a configuration in which the plurality of pins are tightly fastened in the accommodation unit 112 to lock the positions thereof after the plurality of pins have been displaced in accordance with the outer shape of the workpiece, a configuration in which the plurality of pins are made of a magnetic material, and the positions of the plurality of pins are secured by a magnetic action in the accommodation unit 112, or a configuration in which a hydraulic working chamber is arranged at the base end of each pin to drive each pin hydraulically, can be used.

In the machining system 100 shown in FIG. 1, when the type of the workpiece to be machined changes and setup changing is performed, it is necessary to set the machining jig 13 so that the new workpiece to be machined can be clamped in precise positions. As described in detail below, in the present embodiment, during setup changing, a master workpiece including a mock clamped portion having a shape which is identical to that of the clamped portion of the new workpiece to be machined is mounted on the tool spindle axis 1, and the master workpiece is pressed against the shape-receiving jigs 11, 12 to retain the shape of the workpiece thereon. As a result, the shape-receiving jigs 11, 12 can be set so that a shape following the outer shape of the workpiece is formed in precise positions, whereby the workpiece can be clamped at precise positions and machining can be performed.

Figure 4:
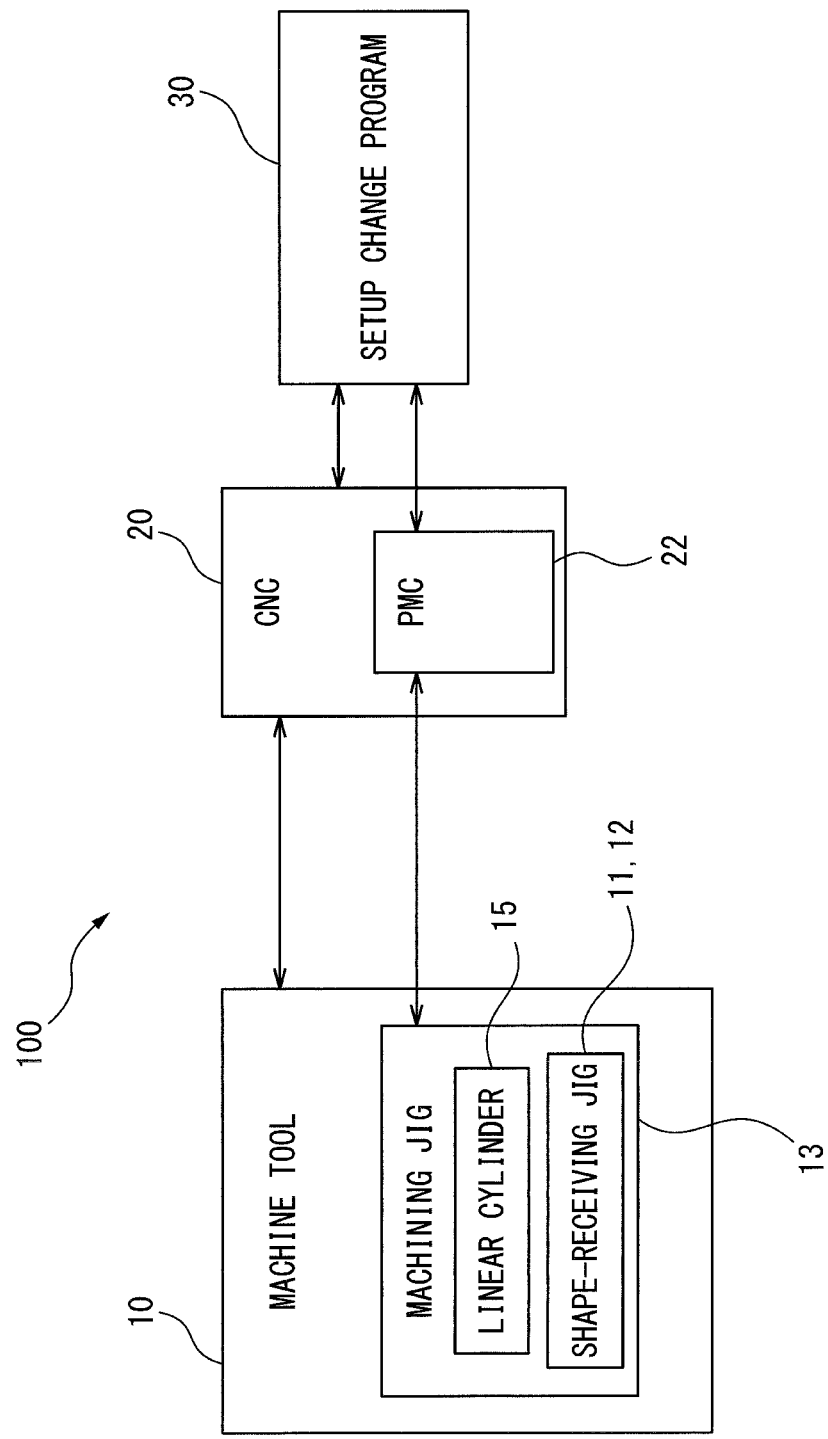
FIG. 4 is a functional block diagram of the machining system.

FIG. 4 shows a functional block diagram of the machining system 100. The functional block diagram of FIG. 4 illustrates the functions of the machine tool 10 and the CNC 20 with particular attention to functions related to setup changing. As shown in FIG. 4, the machine tool 10 comprises, as the components constituting the machining jig 13, the linear cylinder 15, and the shape-receiving jigs 11, 12. In addition to a function for executing control of the three-axis machining with the tool spindle axis 1 in accordance with a machining program, the CNC 20 has a PMC (programmable machine controller) 22 for controlling the machining jig 13. The PMC 22 is responsible for processing the ladder language and controlling the sequence of operations of the peripheral devices such as the machining jig 13. During setup changing, the CNC 20 controls the machine tool 10 and the machining jig 13 in accordance with a setup change program 30. The setup change program 30 may be stored in a storage device within the CNC 20, or alternatively, may be supplied to the CNC 20 from an external device connected to the CNC 20 via a network. Note that the setup change program 30 may be recorded on any of various types of computer-readable storage media such as ROM, RAM, flash memory, a hard disk, CD-ROM, or DVD-ROM.

Figure 5:
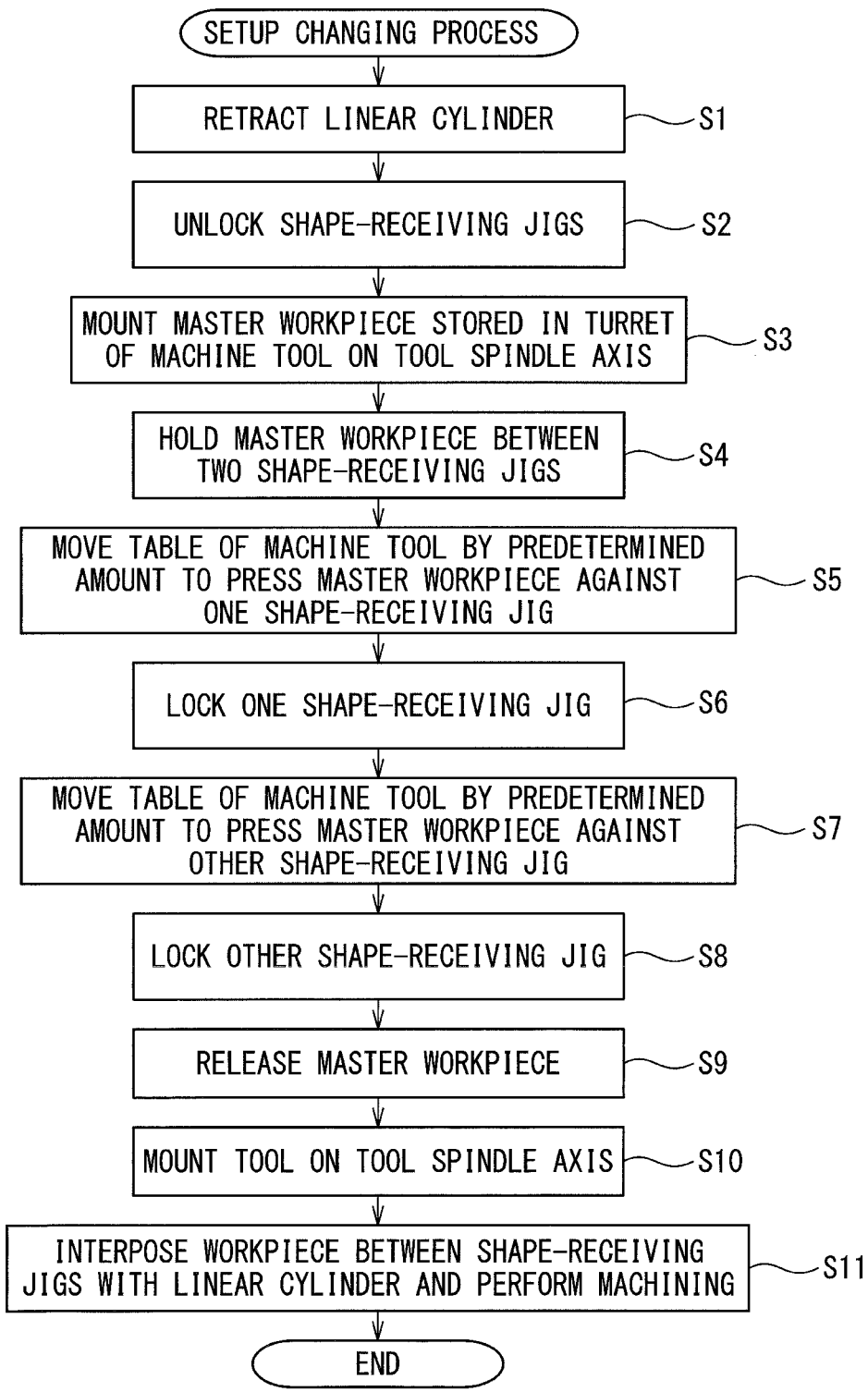
FIG. 5 is a flowchart showing the setup changing process.

FIG. 5 is a flowchart showing the setup changing process executed during setup changing. This setup changing process is realized by execution of the setup change program 30 by the CPU of the CNC 20. Note that when the setup changing process is executed, the movable table 3 and the swingable table 16 are located in their initial positions. Furthermore, a master workpiece A1 including a mock clamped portion having the same shape as the clamped portion of a workpiece used in a subsequent machining process is mounted in advance on the turret 5. First, the CNC 20 positions the linear cylinder 15 at the initial position by causing the linear cylinder to retract (step S1), and unlocks the pins 111, 121 of the two shape-receiving jigs 11, 12 (step S2). As a result, the shape-receiving jigs 11, 12 can be deformed in accordance with the shape of the master workpiece A1. Next, the CNC 20 mounts the master workpiece A1 onto the tool spindle axis 1 by moving the turret 5 to the tool exchange position, performing indexing rotation of the turret 5, and moving the tool spindle axis 1 (step S3).

Figure 6:
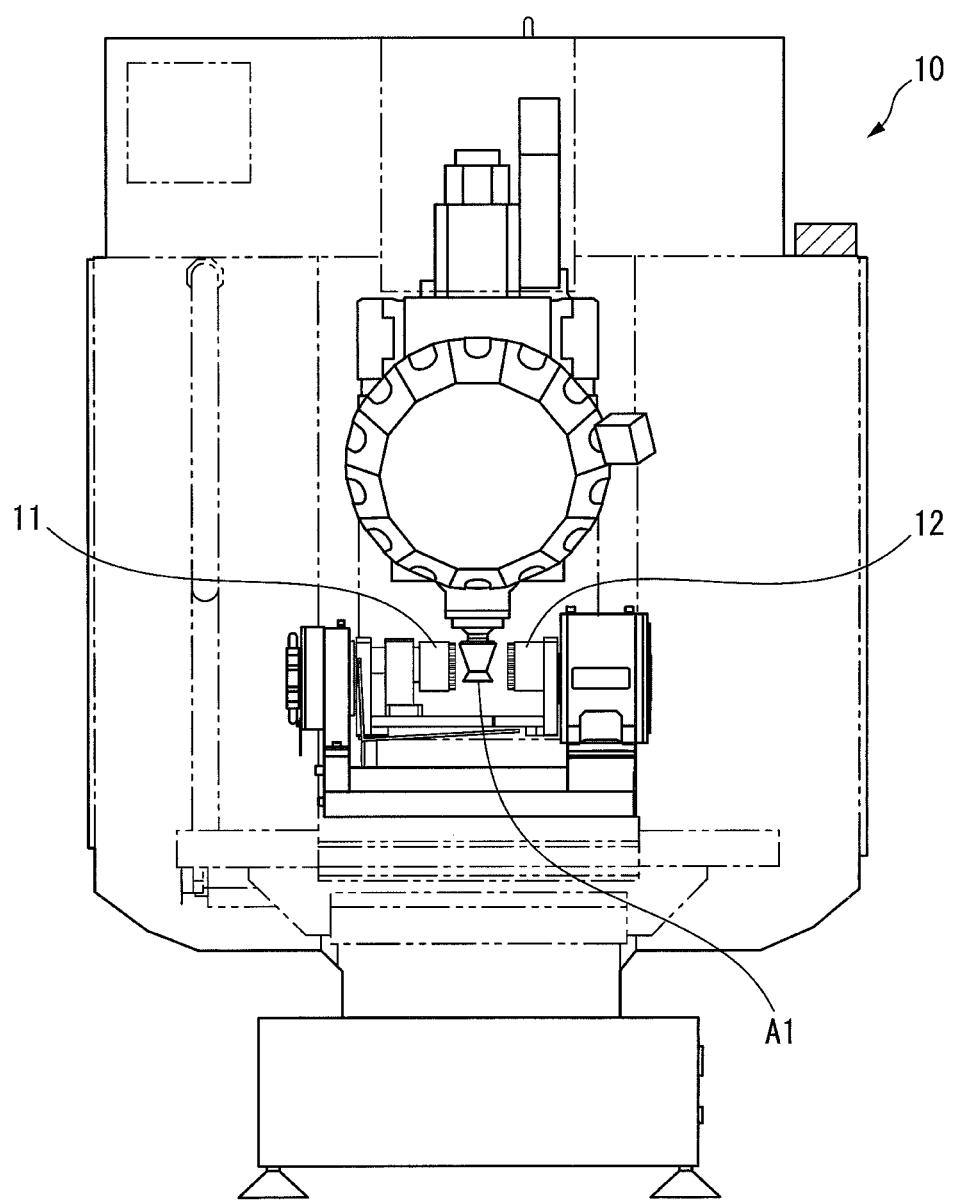
FIG. 6 is a view showing a state in which a master workpiece is disposed between a pair of shape-receiving jigs.
Figure 7:
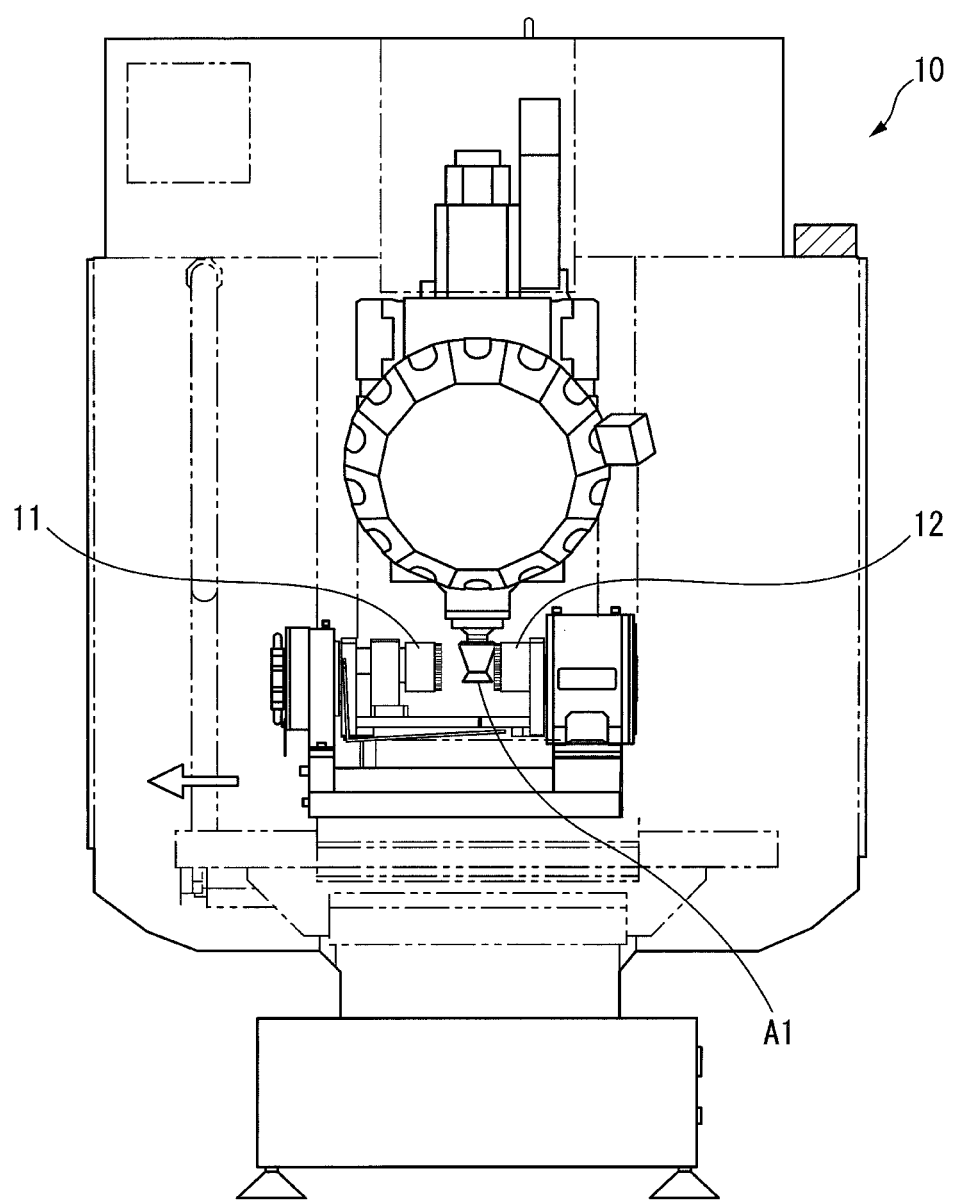
FIG. 7 is a view showing a state in which the master workpiece is pressed against one of the shape-receiving jigs.
Figure 8:
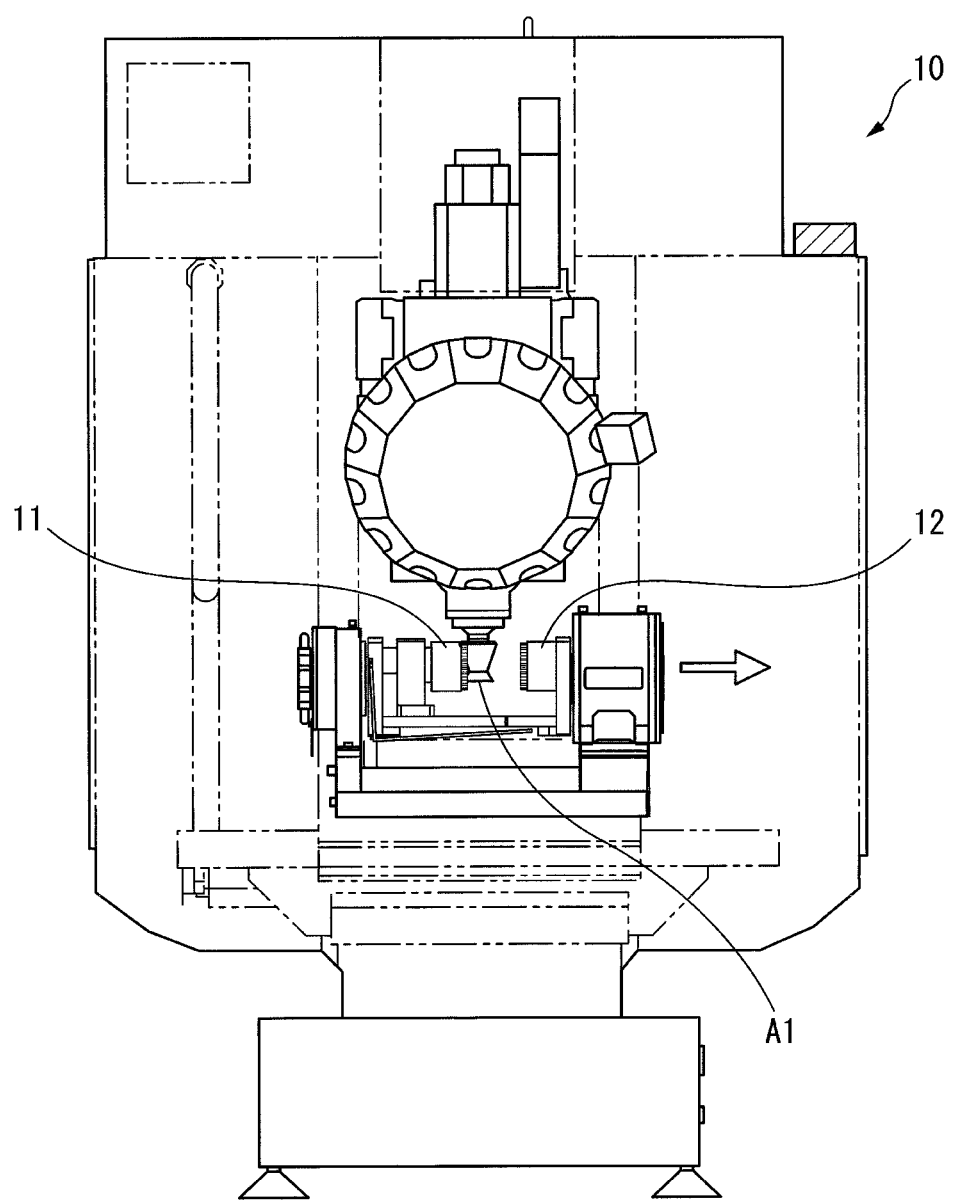
FIG. 8 is a view showing a state in which the master workpiece is pressed against the other shape-receiving jig.

Next, the CNC 20 positions the master workpiece A1 at a position between the shape-receiving jigs 11, 12 by controlling the position of the tool spindle axis 1 (step S4). FIG. 6 shows a state in which the master workpiece A1 has been positioned between the shape-receiving jigs 11, 12 by the process of step S4. Next, the CNC 20 presses the master workpiece A1 against the shape-receiving jig 12 by moving the movable table 3 in the leftward direction on the sheet of FIG. 7, as shown in FIG. 7 (step S5). As a result, the pin tips 12a of the pins 121 are displaced in accordance with the shape of the side surface of the mock clamped portion of the master workpiece A1 on the pin tip 12a side. Next, the CNC 20 locks the shape-receiving jig 12 (step S6). As a result, the pin tips 12a are secured in a state in which the shape of the side surface of the mock clamped portion of the master workpiece A1 on the pin tip 12a side is retained. Next, the CNC 20 presses the master workpiece A1 against the shape-receiving jig 11 by moving the movable table 3 in the rightward direction on the sheet of FIG. 8, as shown in FIG. 8 (step S7). As a result, the pin tips 11a of the pins 111 are displaced in accordance with the shape of the side surface of the mock clamped portion of the master workpiece A1 on the pin tip 11a side. Next, the CNC 20 locks the shape-receiving jig 11 (step S8). As a result, the pin tips 11a are secured in a state in which the shape of the side surface of the mock clamped portion of the master workpiece A1 on the pin tip 11a side is retained. Note that though the movable table 3 is moved relative to the tool spindle axis 1 in the above operation, the shape-receiving jigs 11, 12 can be deformed in accordance with the shape of the master workpiece A1 by securing the movable table 3 and moving the tool spindle axis 1 relative to the movable table 3.

After the shape-receiving jigs 11, 12 are deformed in accordance with the outer shape of the mock clamped portion of the master workpiece A1 in this manner, and locked in such a state, the CNC 20 moves the tool spindle axis 1 upwards to release the master workpiece A1 from the position between the shape-receiving jigs 11, 12 (step S9).

Figure 9:
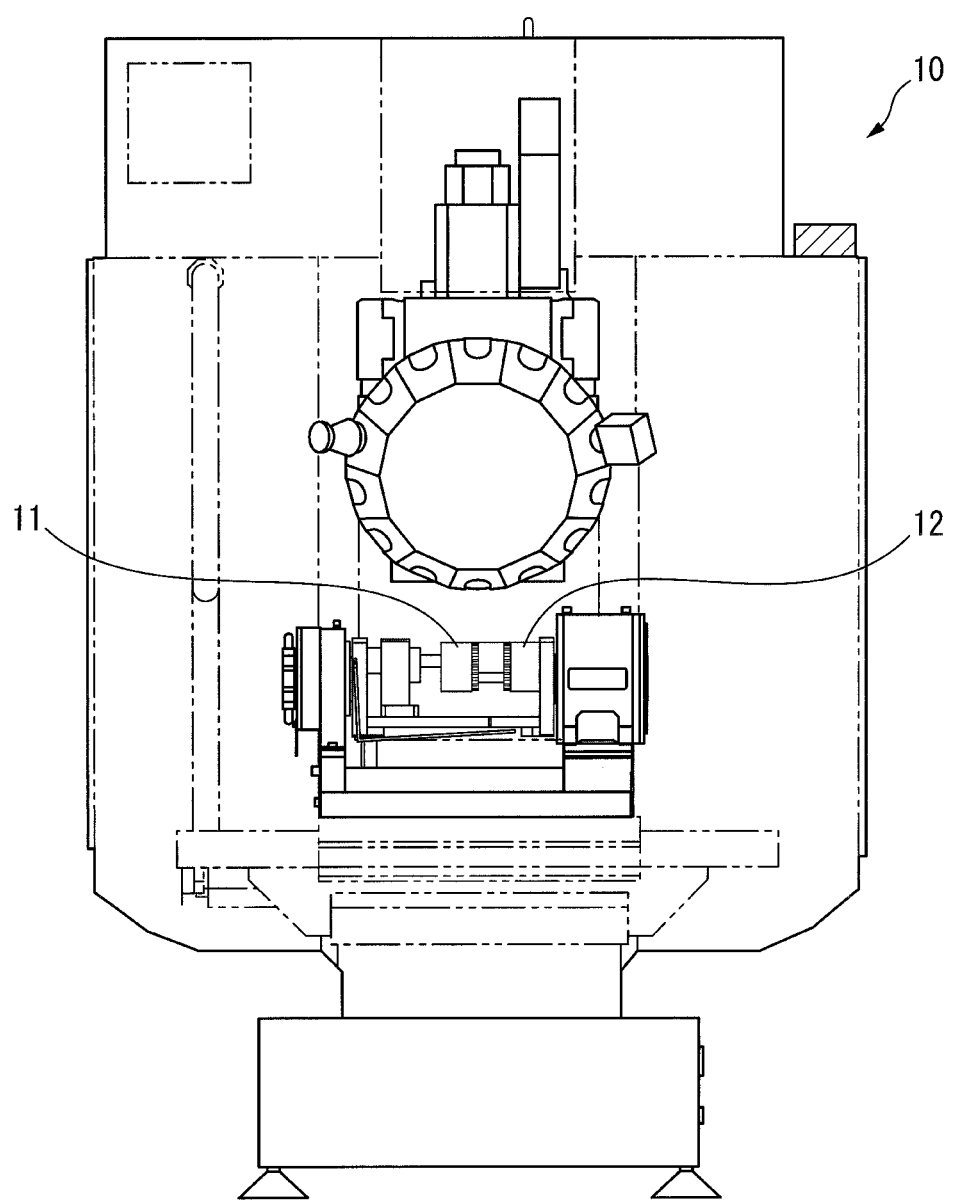
FIG. 9 is a view showing a state in which a workpiece is clamped by the shape-receiving jigs.

Since preparation for machining of a workpiece has been completed by the above processes, the CNC 20 mounts the tool for machining the workpiece onto the tool spindle axis 1 from the turret 5 (step S10). Further, the CNC 20 clamps the workpiece between the shape-receiving jigs 11, 12 by driving the linear cylinder 15 as shown in FIG. 9, and can execute machining of the workpiece (step S11). The operation for clamping the workpiece onto the machining jig 13 may be manually performed by the operator, or can be automatically performed by a robot.

According to the setup changing process described above, by attaching the master workpiece to the tool spindle axis 1, the position of which can be accurately controlled by the CNC 20, and the master workpiece can be accurately positioned with respect to the machining jig 13. Further, by pressing the master workpiece attached to the tool spindle axis 1 against the shape-receiving jigs 11, 12 while accurately controlling the position of the master workpiece with the CNC 20, the shape-receiving jigs 11, 12 can be locked so as to follow the shape of the master workpiece. As a result, shapes which follow the shape of the workpiece can be formed at precise positions with respect to the shape receiving jigs 11, 12. Thus, machining can be executed in a state in which the workpiece is precisely positioned and clamped. Further, according to the setup changing process described above, since mounting of the master workpiece onto the tool spindle axis 1 can be automatically performed, the setup changing time can be shortened, whereby high efficiency can be achieved.

Figure 10:
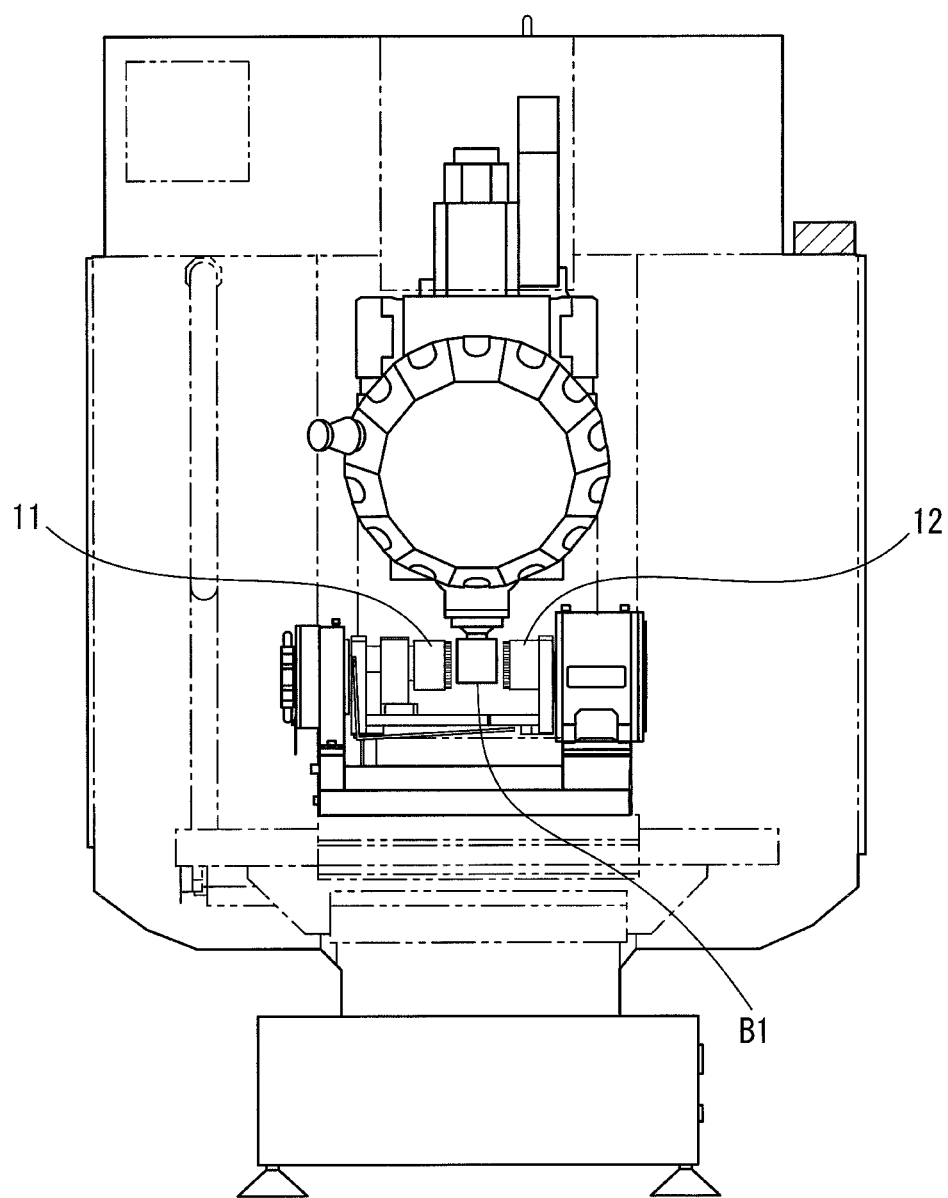
FIG. 10 is a view showing a state in which a different master workpiece is mounted onto the tool spindle axis from a turret.

When a subsequent setup changing process is performed after the setup changing process of FIG. 5 has ended and machining of a workpiece corresponding to the master workpiece A1 has ended, a master workpiece B1 having a shape different than that of the master workpiece A1, as shown in FIG. 10, is mounted onto the tool spindle axis 1 from the turret 5, and the setup changing process shown in FIG. 5 can be executed for the master workpiece B1.

As described above, according to the embodiments of the present disclosure, received shapes which follow the outer shape of the workpiece can be formed at precise positions on the machining jig. As a result, the workpiece, which has been precisely positioned, can be machined, and it is possible to shorten the time by automating the setup changing.

Though embodiments of the present disclosure have been described above, a person skilled in the art could understand that various modifications and changes can be made without deviating from the scope disclosed in the claims, which are described later.

Figure 11:
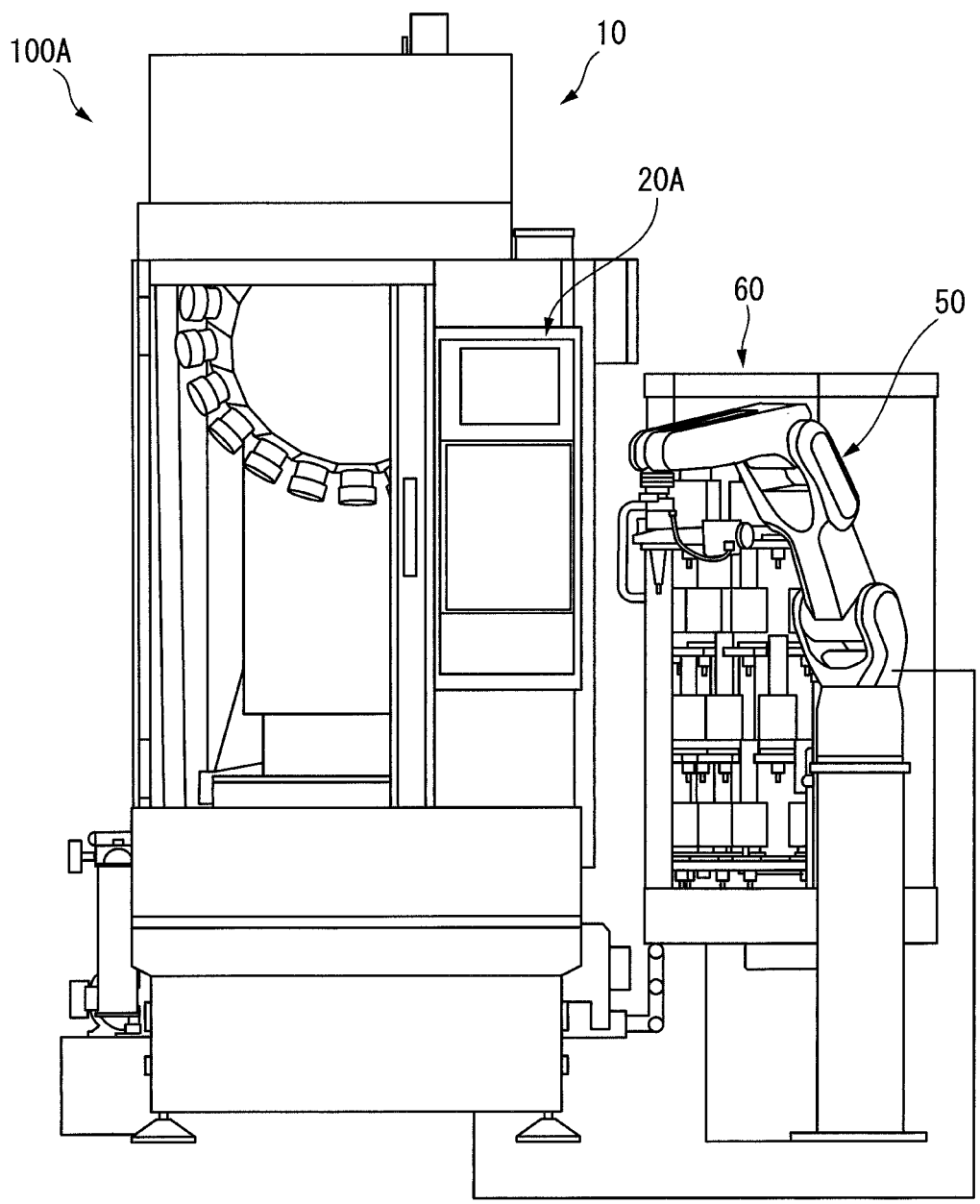
FIG. 11 is a front view showing the configuration of a machining system comprising a robot which executes master workpiece exchange.
Figure 12:
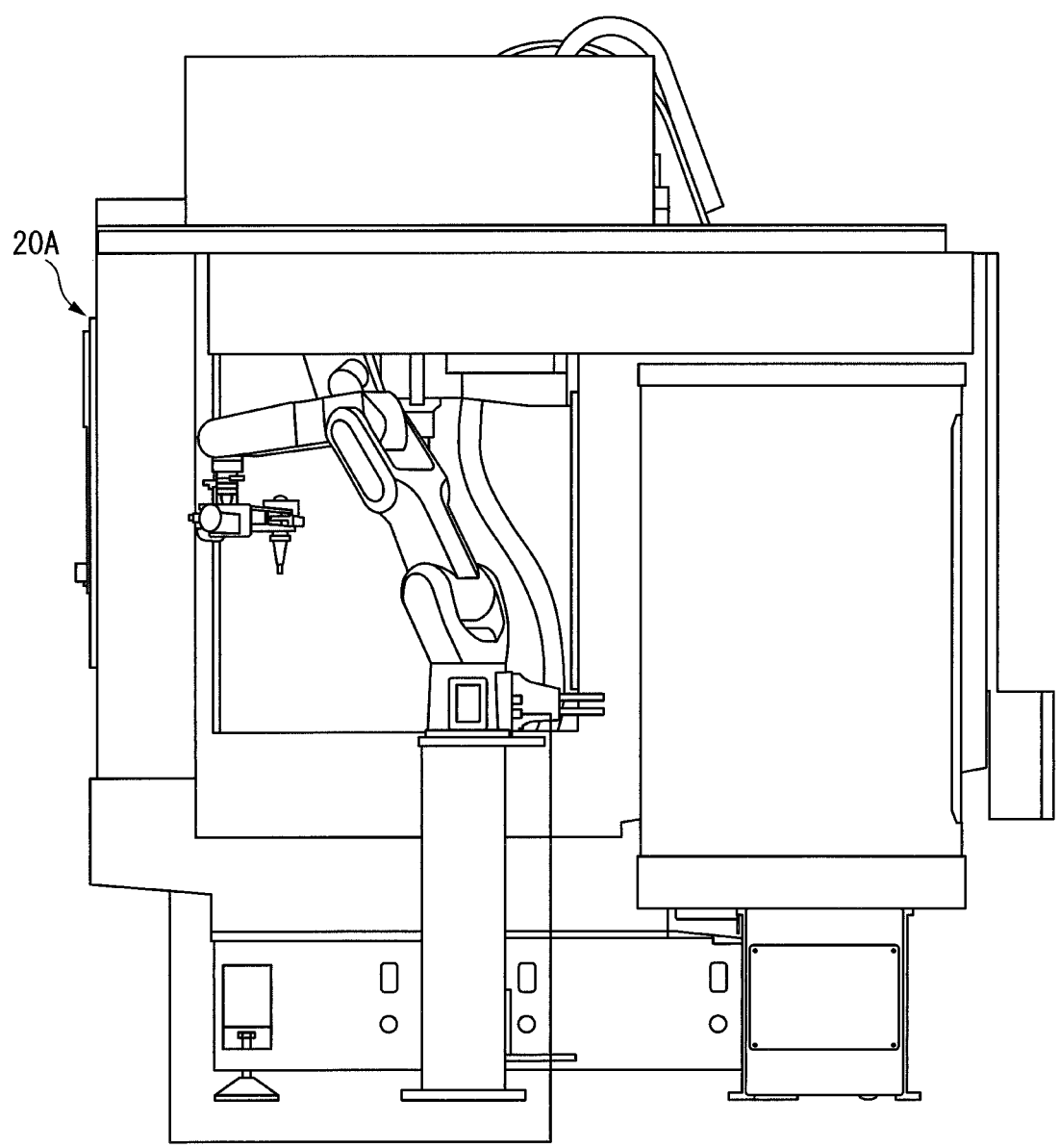
FIG. 12 is a side view showing the configuration of the machining system comprising the robot which executes master workpiece exchange.

FIGS. 11 and 12 are views showing the configuration of a machining system 100A, which corresponds to a configuration in which a robot 50 for executing exchange of the master workpiece is added to the machining system 100 shown in FIG. 1, and FIG. 12 shows a state in which the machining system 100A is viewed from the side. The machining system 100A comprises the machine tool 10, a CNC 20A which controls the machine tool 10, a robot 50, and a storage apparatus 60 as a storage unit for the master workpieces. The CNC 20A functions in the same manner as the CNC 20 of FIG. 1, and is configured so as to cooperate with the robot 50. The CNC 20A is incorporated in the machine tool 10.

Figure 13:
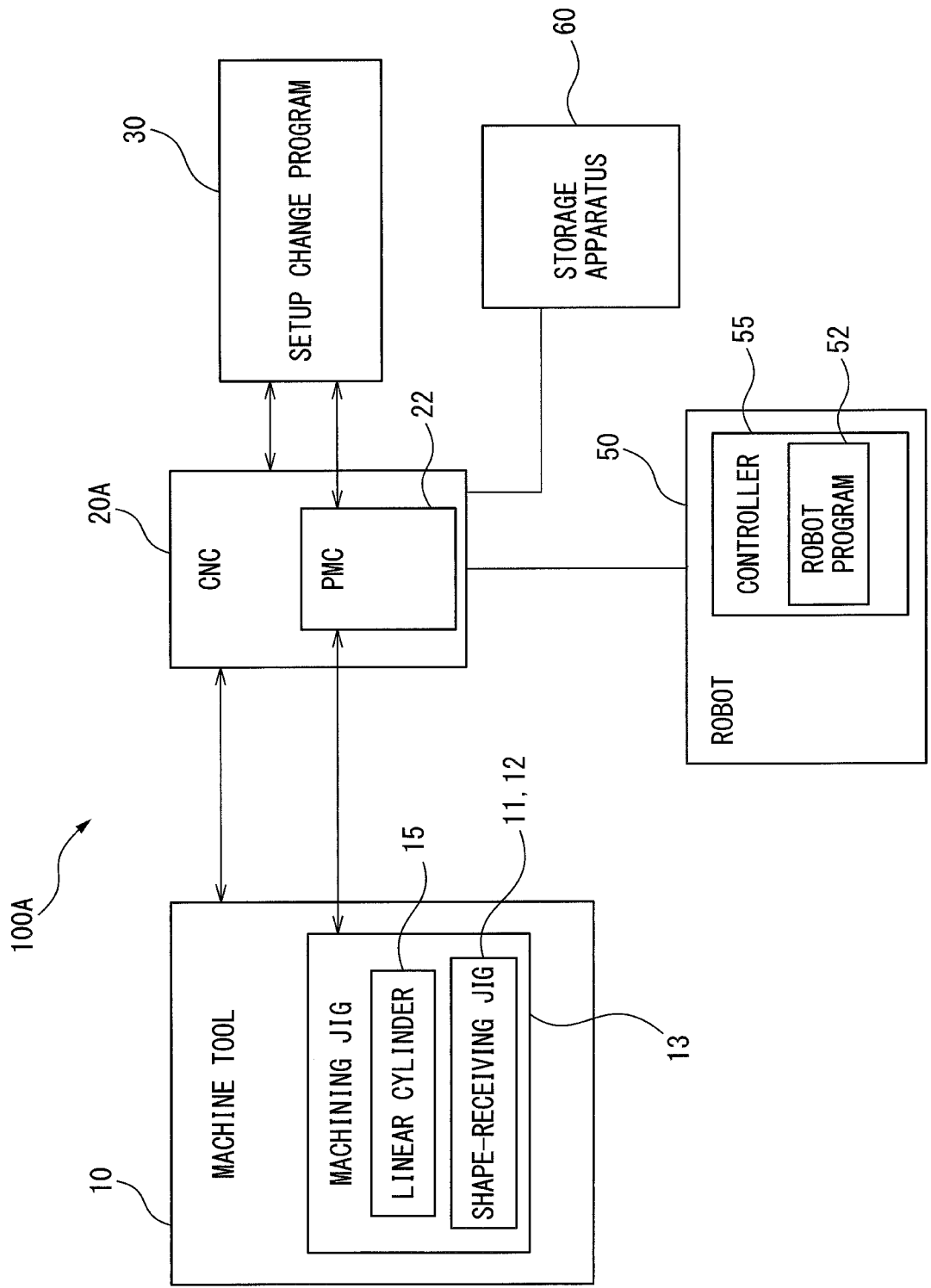
FIG. 13 is a functional block diagram of the machining system of FIG. 11.

FIG. 13 is a functional block diagram of the machining system 100A. The robot 50 comprises a controller 55 which controls the robot 50. The controller 55 executes a master workpiece exchange process during setup changing in accordance with a robot program 52. The storage apparatus 60 comprises a support part which supports a plurality of master workpieces, and a movement mechanism for the support part. By moving the support part in accordance with the control from the CNC 20A, the robot 50 can withdraw an appropriate master workpiece, and can store the master workpiece in an appropriate position. To prepare for setup changing, the robot 50 executes an operation to exchange the master workpiece supported on the turret 5 of the machine tool 10 with a master workpiece supported in the storage apparatus 60 in accordance with an external command input. When exchanging of the master workpiece is complete, the controller 55 of the robot 50 notifies the CNC 20A that the master workpiece exchange is complete. As a result, the CNC 20A can execute the setup changing process shown in FIG. 5.

Though the tool support device for supporting the tools and the master workpieces is configured as a turret-type device in the embodiments described above, the tool support device can be any of various types of devices such as a gang tooling type device or a conveyor type device which uses a chain.

Though the machine tool 10 is configured as a vertical machining center in the embodiments described above, the machine tool 10 may have a horizontal-type or planer-type configuration.

Note that the process of deforming the shape-receiving jigs 11, 12 shown in FIG. 5 to the outer shape of the workpiece may be executed not only at the time of setup changing, but also, for example, when the shape-receiving jigs are reattached during maintenance.

Furthermore, in order to achieve the object of the present disclosure, the various aspects below and the effects thereof can be provided. Note that the numbers within the parentheses in the descriptions of the aspects below correspond to the reference signs of the drawings of the present disclosure.

For example, the first aspect of the present disclosure provides a setup changing method for a machine tool (10) including a tool spindle axis (1), a tool support device (5) which supports a tool which is exchangeably attachable to the tool spindle axis (1), and a jig (13) having a gripping part which deforms in accordance with a shape of a clamped portion of a workpiece, the method comprising: mounting, onto the tool spindle axis (1), a master workpiece having a mock clamped portion which has the same shape as the shape of the clamped portion of the workpiece; deforming the gripping part by gripping, with the gripping part of the jig (13), the mock clamped portion of the master workpiece mounted on the tool spindle axis (1); and removing the master workpiece mounted on the tool spindle axis (1) and mounting the tool supported on the tool support device (5) onto the tool spindle axis (1), wherein the workpiece, the clamped portion of which is gripped by the gripping part deformed in accordance with the mock clamped portion, can be machined with the tool.

According to the first aspect above, the received shapes conforming with the outer shape of the workpiece can be formed on precise positions on the machining jig, the workpiece can be positioned in an exact position and machining can be performed, and it is possible to shorten the duration of the setup changing by means of automation.

The second aspect of the present disclosure provides the setup changing method according to the first aspect above, wherein the gripping part comprises a pair of gripping members (11, 12) arranged to face each other so as to grip the workpiece interposed therebetween, and the deforming the gripping part includes sequentially deforming the pair of gripping members (11, 12) in accordance with the shape of the mock clamped portion by moving the tool spindle axis (1) on which the master workpiece is mounted and the jig (13) relative to each other.

The third aspect of the present disclosure provides the setup changing method according to the first aspect or the second aspect above, further comprising supporting the master workpiece on the tool support device (5) in advance.

The fourth aspect of the present disclosure provides the setup changing method according to any one of the first aspect through the third aspect above, further comprising exchanging, using a robot (50), the master workpiece supported on the tool support device (5) with another master workpiece maintained in a storage unit (60) arranged outside the machine tool (10).

The fifth aspect of the present disclosure provides a machining system (100), comprising: a machine tool (10) including a tool spindle axis (1), a tool support device (5) which supports a tool which is exchangeably attachable to the tool spindle axis (1), and a jig (13) having a gripping part which deforms in accordance with a shape of a clamped portion of a workpiece; and a controller (20) that controls the machine tool (10), wherein the controller causes: a master workpiece, which includes a mock clamped portion having the same shape as the shape of the clamped portion of the workpiece and which is held on the tool support device (5), to be mounted onto the tool spindle axis (1); the gripping part to be deformed by gripping the mock clamped portion of the master workpiece, which is mounted on the tool spindle axis (1), with the gripping part of the jig; and the master workpiece mounted on the tool spindle axis (1) to be removed, and the tool supported on the tool support device (5) to be mounted onto the tool spindle axis (1), and wherein the workpiece, the clamped portion of which is gripped by the gripping part deformed in accordance with the mock clamped portion, can be machined with the tool.

According to the fifth aspect above, the received shape conforming with the outer shape of the workpiece can be formed on an exact position on the machining jig, the workpiece can be positioned in an exact position and machining can be performed, and it is possible to shorten the duration of the setup changing by means of automation.

The sixth aspect of the present disclosure provides the machining system (100) according to the fifth aspect above, wherein the jig (13) comprises a pair of gripping members (11, 12) arranged to face each other so as to grip the workpiece interposed therebetween, and the controller (20) causes the pair of gripping members (11, 12) to be sequentially deformed in accordance with the shape of the mock clamped portion by moving the tool spindle axis (1) on which the master workpiece is mounted and the jig (13) relative to each other.

The seventh aspect of the present disclosure provides the machining system (100) according to the fifth aspect or the sixth aspect above, wherein the tool support device (5) is a turret-style tool support device comprising a turret on which a plurality of tool holders (51) are arranged in a circumferential direction.

The eighth aspect of the present disclosure provides the machining system (100) according to any one of the fifth aspect through the seven aspect above, wherein the machine tool (10) comprises: a spindle axis head (2) arranged to be movable in a vertical axis direction, the spindle axis head being configured to hold the tool spindle axis (1) so as to be rotatable about a vertical axis; and a table (3) arranged below the tool spindle axis (1) to support the jig.

The ninth aspect of the present disclosure provides the machining system (100) according to any one of the fifth aspect through the eighth aspect above, further comprising a robot (50) which exchanges the master workpiece supported on the tool support device (5) with another master workpiece maintained in a storage unit (60) arranged outside the machine tool (10).

The invention claimed is:

1. A setup changing method for a machine tool including a tool spindle, a storage magazine which stores a tool which is exchangeably attachable to the tool spindle, and a machining jig having a gripping part which deforms in accordance with a shape of a clamped body of a master workpiece, the setup changing method comprising:
    mounting, onto the tool spindle, the master workpiece, wherein the clamped body of the master workpiece has the same shape as the shape of a clamped body of a workpiece to be machined;
    deforming the gripping part by gripping, with a plurality of straight displaceable pins of the gripping part, the clamped body of the master workpiece while the master workpiece is mounted on the tool spindle;
    removing the master workpiece from the tool spindle and storing the now removed master workpiece in the storage magazine; and
    mounting the tool stored in the storage magazine onto the tool spindle, wherein
    the workpiece to be machined, the clamped body of which is gripped by the gripping part that was deformed in accordance with the clamped body of the master workpiece, is machined with the tool.

2. The setup changing method according to claim 1, wherein
    the gripping part comprises a pair of shape receiving jigs, which are arranged to face each other so as to grip the workpiece interposed therebetween, and
    the deforming of the gripping part includes:
        sequentially deforming the pair of shape receiving jigs by displacing the plurality of straight pins associated with each of the shape receiving jigs in accordance with the shape of the clamped body of the master workpiece through relative movement of the tool spindle on which the master workpiece is mounted and the machining jig.

3. The setup changing method according to claim 1, further comprising:
    storing the master workpiece in the storage magazine in advance of the master workpiece being mounted on the tool spindle.

4. The setup changing method according to claim 1, further comprising:
    exchanging, using a robot, the master workpiece stored in the storage magazine with another master workpiece maintained in a storage unit that is arranged outside the machine tool.

5. A machining system, comprising:
    a machine tool including a tool spindle, a storage magazine which stores a tool which is exchangeably attachable to the tool spindle, and a machining jig having a gripping part which deforms in accordance with a shape of a clamped body of a master workpiece; and
    a controller that controls the machine tool, wherein
    the controller is configured to cause:
        the master workpiece, which is held in the storage magazine, to be mounted onto the tool spindle, wherein the clamped body of the master workpiece has the same shape as the clamped body of a workpiece to be machined;
        the gripping part to be deformed by gripping, with a plurality of straight displaceable pins of the gripping part, the clamped body of the master workpiece while the master workpiece is mounted on the tool spindle;
        the master workpiece to be removed from the tool spindle and to be stored in said storage magazine, and
        the tool supported in the storage magazine to be mounted onto the tool spindle, and wherein
        the workpiece to be machined, the clamped body of which is gripped by the gripping part that was deformed in accordance with the clamped body of the master workpiece, is machined with the tool.

6. The machining system according to claim 5, wherein
    the gripping part comprises a pair of shape receiving jigs, which are arranged to face each other so as to grip the workpiece interposed therebetween, and
    the controller causes the pair of shape receiving jigs to be sequentially deformed by displacing the plurality of straight pins associated with each of the shape receiving jigs in accordance with the shape of the clamped body of the master workpiece through relative movement of the tool spindle on which the master workpiece is mounted and the machining jig.

7. The machining system according to claim 5, wherein
    the storage magazine is a turret-style storage magazine comprising a plurality of tool holders that are arranged in a circumferential direction.

8. The machining system according to claim 5, wherein the machine tool comprises:
    a spindle head arranged to be movable in a vertical axis direction, the spindle head being configured to hold the tool spindle so as to be rotatable about a vertical axis; and
    a table arranged below the tool spindle to support the machining jig.

9. The machining system according to claim 5, further comprising:
    a robot which exchanges the master workpiece stored in the storage magazine with another master workpiece maintained in a storage unit that is arranged outside the machine tool.

* * * * *